United States Patent
Hou et al.

(10) Patent No.: US 7,868,826 B1
(45) Date of Patent: Jan. 11, 2011

(54) METHOD AND SYSTEM FOR DETERMINING LOCATIONS OF MOBILE STATIONS USING DIRECTIONAL CORRECTIONS

(75) Inventors: Jiongkuan Hou, Olathe, KS (US); James C. Swift, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 12/533,471

(22) Filed: Jul. 31, 2009

Related U.S. Application Data

(62) Division of application No. 11/451,714, filed on Jun. 13, 2006, now Pat. No. 7,659,850.

(51) Int. Cl.
 *G01S 3/02* (2006.01)
 *H04W 24/00* (2009.01)
(52) U.S. Cl. .................................... 342/451; 455/456.1
(58) Field of Classification Search .............. 342/357.2, 342/357.31, 451; 455/456.1
 See application file for complete search history.

(56) References Cited

U.S. PATENT DOCUMENTS

| | | | |
|---|---|---|---|
| 5,389,934 A | 2/1995 | Kass | |
| 5,485,163 A | 1/1996 | Singer et al. | |
| 6,609,012 B1 | 8/2003 | Malmgren et al. | |
| 7,383,049 B2 * | 6/2008 | Deloach et al. | 455/456.1 |
| 7,659,850 B1 | 2/2010 | Hou et al. | |
| 2002/0009974 A1 | 1/2002 | Kuwahara et al. | |
| 2003/0125044 A1 * | 7/2003 | Deloach et al. | 455/456 |
| 2003/0125045 A1 * | 7/2003 | Riley et al. | 455/456 |
| 2003/0125046 A1 | 7/2003 | Riley et al. | |
| 2003/0181163 A1 | 9/2003 | Ofuji et al. | |
| 2004/0091026 A1 | 5/2004 | Nakayama | |
| 2004/0192330 A1 * | 9/2004 | Gaal | 455/456.1 |
| 2004/0203380 A1 | 10/2004 | Hamdi et al. | |
| 2005/0020309 A1 | 1/2005 | Moeglein et al. | |
| 2005/0227689 A1 | 10/2005 | Jewett | |
| 2006/0009235 A1 | 1/2006 | Sheynblat et al. | |
| 2006/0052115 A1 * | 3/2006 | Khushu | 455/456.3 |
| 2006/0063537 A1 | 3/2006 | Lee et al. | |
| 2007/0216540 A1 | 9/2007 | Riley et al. | |
| 2007/0275717 A1 | 11/2007 | Edge et al. | |

\* cited by examiner

*Primary Examiner*—Thomas H Tarcza
*Assistant Examiner*—Harry Liu

(57) ABSTRACT

A base station almanac (BSA) stores directional forward link calibration (FLC) values that correct for differences between the listed locations of base station antennas and the actual locations of the antennas. Each directional FLC value is specific to wireless signals that are transmitted from a particular base station antenna and propagate toward a particular receiving area. A mobile station operating in a receiving area measures a wireless signal from a base station antenna located outside of the receiving area to obtain a signal measurement. The location of the mobile station is determined by applying a positioning algorithm that uses the signal measurement corrected by the directional FLC value for that particular combination of base station antenna and receiving area.

6 Claims, 5 Drawing Sheets

METHOD AND SYSTEM FOR DETERMINING LOCATIONS OF MOBILE STATIONS USING DIRECTIONAL CORRECTIONS

CROSS-REFERENCE TO RELATED APPLICATIONS

This is a division of application Ser. No. 11/451,714, filed Jun. 13, 2006, which application is incorporated herein by reference.

BACKGROUND

1. Field of the Invention

The present invention relates to determining the locations of mobile stations, more particularly, to a method and system for determining the locations of mobile stations using directional corrections.

2. Description of Related Art

The Global Positioning System (GPS) is often used to determine the locations of mobile stations, for example, to provide location-based services. Such location-based services include services, such as roadside assistance, direction assistance, tracking, whether forecasts, etc., that make use of the locations of mobile stations. Although GPS-based positioning methods are often the most accurate type of positioning method, a mobile station may not always be able to receive good signals from a sufficient number of GPS satellites. This can occur, for example, because of poor weather conditions or because the mobile station is in an urban or indoor environment.

Because of the limitations of GPS-based positioning methods, terrestrial positioning methods have also been developed. In terrestrial positioning, signals from one or more terrestrial locations, such as signals transmitted by base station antennas in cellular wireless networks, are used to determine the location of a mobile station. One such terrestrial positioning approach that is used in CDMA networks is advanced forward link trilateration (AFLT).

In a typical AFLT approach, a mobile station measures the phases of the pilot signals transmitted from four base station antennas. Each pilot signal is synchronized to a standard time, such as a GPS time (although each base station antenna may have a particular time offset). As a result, the phase of a pilot signal from a base station antenna that is measured by a mobile station can be used to calculate the distance between the mobile station and the base station antenna. In this way, the distances between the mobile station and the four base station antennas may be calculated. These four distance measurements can then be used to calculate the mobile station's location and time offset, provided the locations of the base station antennas and their respective time offsets are known.

A mobile station's location may also be calculated using a hybrid approach. In a hybrid approach, measurements of one or more terrestrial signals are combined with measurements of signals from one or more GPS satellites to determine a mobile station's location. For example, one, two, or three of the distance measurements that would be used for AFLT may be replaced by measurements of signals from GPS satellites.

To support AFLT or hybrid approaches, CDMA networks often store the locations of base stations and their time offsets in a base station almanac (BSA). The base station locations may be stored in the BSA as latitude and longitude coordinates. The time offsets are typically stored in the BSA as forward link calibration (FLC) values. During a location determination session, the mobile station may measure the phases of the pilot signals from four base station antennas and report the phase measurements to the network. An element in the network, such as a position determining entity (PDE), may then calculate the mobile station's location based on the phase measurements from the mobile station and the base station locations and time offsets listed in the BSA.

However, the base station locations in the BSA may not be accurate for any number of reasons. For one thing, the locations may not have been collected with the level of precision required to provide good location fixes using AFLTS or hybrid approaches. Another problem is that the base station location listed in the BSA may correspond to the location of the transceiver, rather than to the location of the antenna. In some environments (such as urban areas), the antenna may be located an appreciable distance away from the antenna. Finally, the locations of antennas are often changed as wireless service providers expand and update their coverage. The changed antenna locations may not always be reflected in the BSA in a timely manner. All of these inaccuracies in the base station antenna locations can contribute to inaccuracies in mobile station locations that are calculated using AFLT or hybrid approaches.

Accordingly, there is a need to provide more accurate methods for determining the locations of mobile station based on terrestrial signal measurements.

SUMMARY

In a first principal aspect, an exemplary embodiment of the present invention provides a method for mobile station location determination. In accordance with the method, a wireless signal transmitted from a base station antenna and received by a mobile station located in a receiving area is measured to obtain a signal measurement. A directional correctional value is obtained, wherein the directional correction value is specific to wireless signals that are transmitted from the base station antenna and propagate toward the receiving area. A location of the mobile station is determined by applying a positioning algorithm that uses the signal measurement and the directional correction value.

In a second principal aspect, an exemplary embodiment of the present invention provides a system for mobile station location determination. The system comprises data storage storing positioning information and a position determining entity (PDE) for determining locations of mobile stations using the positioning information. The positioning information identifies at least one receiving area and a plurality of transmitting areas. For the at least one receiving area, the positioning information includes a plurality of directional correction values, each of the directional correction values being specific to wireless signals transmitted from a particular one of the transmitting areas and received in the at least one receiving area.

In a third principal aspect, an exemplary embodiment of the present invention provides a method of correcting for a location difference between an actual location of a base station antenna and a listed location of the base station antenna. In accordance with the method, a wireless signal transmitted from the base station antenna and received at a measurement point in a receiving area is measured to obtain a signal measurement. A first location estimate of the measurement point is obtained by a first positioning method that used the signal measurement and the listed location. A second location estimate of the measurement point is obtained by a second positioning method, wherein the second location estimate is more accurate than the first location estimate. A directional forward link calibration (FLC) value is calculated based, at least in part, on the first and second location estimates such that the directional FLC value corrects for the location difference.

DETAILED DESCRIPTION OF EXEMPLARY EMBODIMENTS

1. Overview

Figure 1:
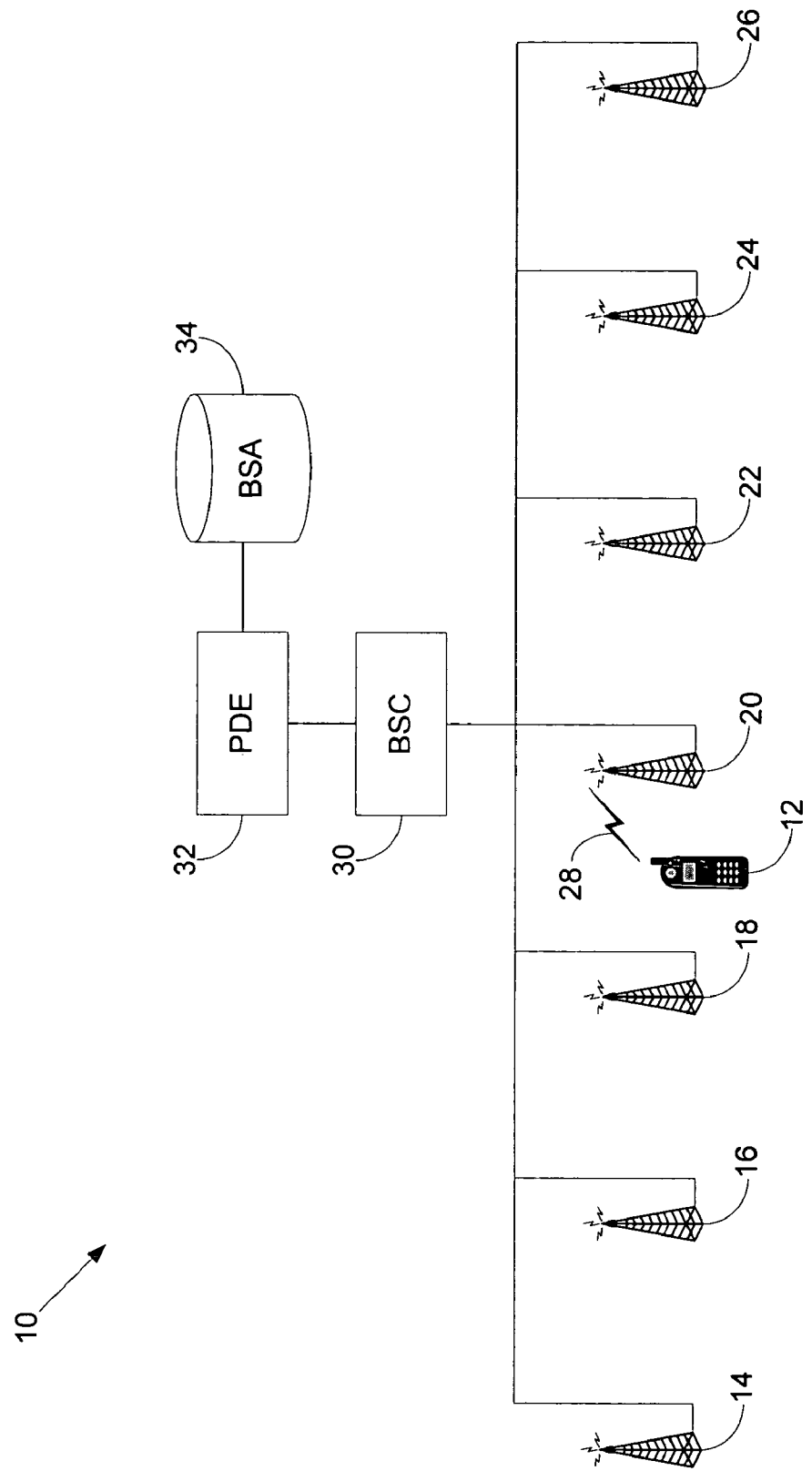
FIG. 1 is a simplified block diagram of a wireless telecommunications network, in accordance with an exemplary embodiment of the present invention.

The present invention, in its exemplary embodiments, provides methods and systems for determining the locations of mobile stations using directional correction values. The directional correction values may be used in positioning methods that rely on measurements of one or more terrestrial signals. Such positioning methods may include advanced forward link trilateration (AFLT) and/or hybrid methods. In an exemplary embodiment, the directional correction values are provided as directional forward link calibration (FLC) values and are stored in a base station almanac (BSA). The directional FLC values may replace or supplement conventional, non-directional FLC values. Thus, a directional FLC value may correct for both a base station's time offset and the base station's location offset, i.e., a difference between the actual location of the base station antenna and the location of the base station antenna that is listed in the BSA.

A directional FLC may be directional because it may be valid for a particular direction or range of directions, which may be defined by a particular transmitting area relative to a particular receiving area. The transmitting and receiving areas could be distinct cells or sectors in a cellular wireless network. Thus, when a mobile station located in a particular receiving area measures wireless signals transmitted by a base station antenna located in a particular transmitting area, a directional FLC value that is specific to that particular combination of transmitting and receiving areas may be applied.

In this way, each receiving area may be associated with a plurality of directional FLC values, each of which is specific to signals transmitted from a particular transmitting area. For example, each receiving area may be associated with six (or some other number of) directional FLC values, one for each of the receiving area's nearest neighbor areas. The directional FLC values for a receiving area may be stored in the BSA as part of a record for that receiving area. Then, when a wireless signal transmitted by a base station antenna in a transmitting area is measured by a mobile station located in a receiving area, the directional FLC value associated with that particular receiving area for signals from that particular transmitting area may be applied.

The directional FLC values may be determined by comparing location estimates obtained by two different methods. For example, location estimates for a mobile station located at a particular measurement point in a receiving area might be obtained by a GPS-based method, i.e., using signals from four GPS satellites, and by a less-accurate positioning method that uses a measurement of at least one terrestrial signal, e.g., a signal from a base station. The location estimate from the more accurate GPS method may then be used to calculate a correction value that corrects the base station signal measurement so as to bring the two location estimates into agreement.

Correction values for the base station may be obtained in this way for other measurement points in the receiving area. The correction values from different measurement points in the receiving area may then be averaged to obtain an average correction value for wireless signals transmitted from the base station and received in the receiving area. The average correction value may be stored in the BSA as the directional FLC value specific to that particular base station and that particular receiving area. Thus, the directional FLC value would correct for the base station's time offset as well as the base station's location offset, i.e., the difference between the actual location of the base station antenna and the location listed in the BSA.

2. Exemplary Architecture

FIG. 1 is a block diagram illustrating an exemplary wireless telecommunications network 10 that provides wireless service to mobile stations, such as mobile station 12. Wireless telecommunications network 10 includes a plurality of base stations, exemplified in FIG. 1 by base stations 14, 16, 18, 20, 22, 24, and 26. Although network 10 is shown in FIG. 1 with seven base stations, it is to be understood that network 10 could include a greater or fewer number of base stations.

Each base station includes at least one antenna to provide wireless coverage in an area such as a cell or sector. Within a base station's wireless coverage area, the base station may wirelessly communicate with one or more mobile stations. Such wireless communication may involve the mobile station transmitting or receiving voice, data, or other media via an air interface. For example, mobile station 12 may be operating in a wireless coverage area provided by base station 20 and may communicate with base station 20 via an air interface 28. In an exemplary embodiment, the air interface communications in network 10 occur in a code division multiple access (CDMA) format. However, other air interface formats could also be used.

Base stations 14-26 may be controlled by one or more base station controllers, such as base station controller (BSC) 30. BSC 30 may, in turn, communicate with other network elements, such as a mobile switching center (MSC) and/or packet data serving node (PDSN) to support the exchange of voice, data, or other media with mobile stations, such as mobile station 12. BSC 30 may also communicate with a positioning determining entity (PDE) 32, in order to support location determinations of mobile stations, such as mobile station 12. PDE 32 may perform calculations to estimate the locations of mobile stations, for example, based on signal measurements provided by the mobile stations and positioning information stored in network 10.

In an exemplary embodiment, network 10 stores the positioning information in the form of a base station almanac (BSA). The BSA may be stored in a BSA database 34 so as to be accessible by PDE 32. The BSA may list the locations of the base stations in network 10, e.g., the latitude and longitude coordinates of base stations 14-26. The BSA may also include other information that may be used in AFLT or other terrestrial positioning algorithms. For example, the BSA may include a conventional FLC value for each base station. A conventional FLC value for a base station corrects for the base station's time offset from GPS time. The BSA may also store a plurality of directional FLC values for each wireless coverage area. Each directional FLC value corrects for (i) the time offset for wireless signals from a base station in a neighboring wireless coverage area and (ii) the difference between the actual location of the base station's antenna and the base station location listed in the BSA.

Figure 2:
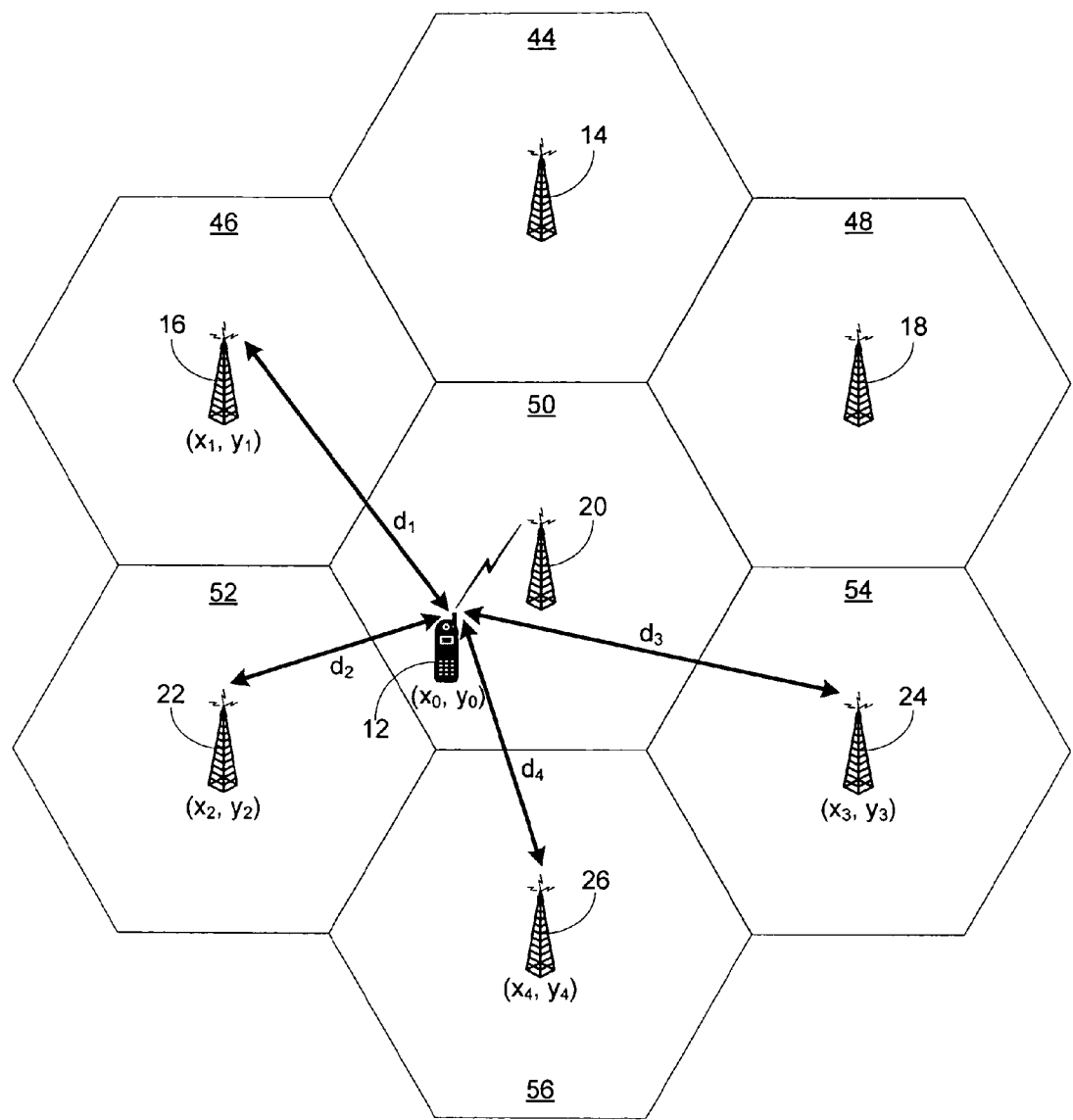
FIG. 2 is a diagram illustrating an arrangement of wireless coverage areas for the wireless telecommunications network shown in FIG. 1, in accordance with an exemplary embodiment of the present invention.

FIG. 2 illustrates an exemplary arrangement of base stations 14-26. In FIG. 2, base stations 14-26 provide wireless coverage in areas that are conceptualized as hexagonal cells 44-56, respectively. In this exemplary arrangement, base station 20 is at the center of cell 50, and cells 44, 46, 48, 52, 54, and 56 are the six nearest neighbor cells. As shown in FIG. 2, mobile station 12 is operating in cell 50 and, therefore, is in communication with base station 20. However, mobile station 12 may also be able to measure wireless signals transmitted from base stations located in one or more neighboring cells, e.g., from base stations 16, 22, 24, and 26. PDE 32 may use these signal measurements to calculate a location estimate for mobile station 12, for example, using an AFLT or hybrid positioning algorithm.

For these location calculations, PDE 32 may use one or more FLC values for cell 50 that are stored in BSA database 34. For cell 50 as shown in FIG. 2, BSA database 34 may store (i) a conventional, non-directional FLC value, FLC_0, which corrects for the time offset of base station 20 with respect to GPS time and (ii) a plurality of directional FLC values, FLC_1 through FLC_6, which correct for time offsets and location offsets for wireless signals transmitted by the base stations in neighboring cells 44, 46, 48, 52, 54, 56. Each of these directional FLC values for cell 50 may be paired with a base station ID number or other identifier of the neighboring cell for which it applies. Although in this example cell 50 is associated with six directional FLC values, corresponding to six nearest neighbor cells, it is to be understood that a cell or other wireless coverage area could be associated with a greater or fewer number of directional FLC values.

It should also be understood that the hexagonal shape of the cells shown in FIG. 2 is intended to represent only the relative locations of the cells. The actual shape of each cell may vary depending on such factors as the locations of the base stations antennas, transmission power levels, the terrain, and the locations of buildings or other obstructions. In addition, although cell 50 is shown in FIG. 2 with six nearest neighbor cells, it is to be understood that a cell might have a greater or fewer number of nearest neighbor cells. Moreover, a base station may include directional antennas to provide wireless coverage in a plurality of sectors. For example, base station 20 may include three sets of directional antennas to subdivide cell 50 into three sectors.

3. Exemplary Method of Location Determination

FIG. 2 may be used to explain an exemplary AFLT method for determining the location of mobile station 12. As shown in FIG. 2, the AFLT method relies on determining distances $d_1$, $d_2$, $d_3$, and $d_4$, which represent the distances between the mobile station and four base stations. Because a CDMA base station synchronizes its wireless transmissions to GPS time, a measurement of the phase of a pilot signal transmitted by the base station, relative to GPS time, provides a measurement of the distance that the wireless signal has propagated, i.e., the distance between the mobile station and the base station's antenna.

FIG. 2 illustrates an example of this approach. While operating in cell 50, mobile station 12 measures the phases of pilot signals from four base stations, e.g., base stations 16, 22, 24, and 26, to obtain phase measurements $\phi_1$, $\phi_2$, $\phi_3$, and $\phi_4$. Assuming that the pilot signals are all synchronized to the same reference time, i.e., GPS time, then the distances $d_1$, $d_2$, $d_3$, and $d_4$ to base stations 16, 22, 24, and 26, respectively, may be calculated from the measured phases.

In practice, however, each of the pilot signals may be offset from GPS time by an amount that is characteristic for each base station. In addition, the mobile station's clock may be offset from GPS time by a certain, unknown amount. Taking $b_0$ as the mobile station's time offset, $b_i$ as the time offset of the ith base station, and c as the speed of light, then $d_i$ the distance between the mobile station and the ith base station may be calculated as follows:

$$d_i = c(\phi_i + b_i - b_0) \qquad (1)$$

Thus, the four phase measurements may be used to calculate the location of mobile station 12 by the following expressions:

$$[(x_0-x_1)^2+(y_0-y_1)^2]^{1/2}=c(\phi_1+b_1-b_0) \qquad (2)$$

$$[(x_0-x_2)^2+(y_0-y_2)^2]^{1/2}=c(\phi_2+b_2-b_0) \qquad (3)$$

$$[(x_0-x_3)^2+(y_0-y_3)^2]^{1/2}=c(\phi_3+b_3-b_0) \qquad (4)$$

$$[(x_0-x_4)^2+(y_0-y_4)^2]^{1/2}=c(\phi_4+b_4-b_0) \qquad (5)$$

In the above expressions, $x_0$ and $y_0$ are the coordinates of the mobile station, and $x_i$ and $y_i$ for i=1, 2, 3, 4 are the coordinates of the base station antennas. The coordinates of the base station antennas may be stored in BSA database 34. The $\phi_i$ values are the phases of the pilot signals measured at the mobile station. The $b_i$ values are the time offsets from GPS time of the base stations. These $b_i$ values may be stored in BSA database 34 as conventional FLC values. The $b_0$ variable is the time offset from GPS time for the mobile station, and c is the speed of light. Thus, given phase measurements $\phi_1$, $\phi_2$, $\phi_3$, and $\phi_4$, and the known values for $x_i$, $y_i$, $b_i$ and c, the mobile station's coordinates ($x_0$, $y_0$) and time offset $b_0$ may be calculated using equations (2)-(5).

Although height is not included in equations (2)-(5), it is to be understood that a height coordinate, $z_0$, for the mobile station could also be calculated from the equations, provided that base station heights, $z_1$, $z_2$, $z_3$, and $z_4$, are known.

Figure 3:
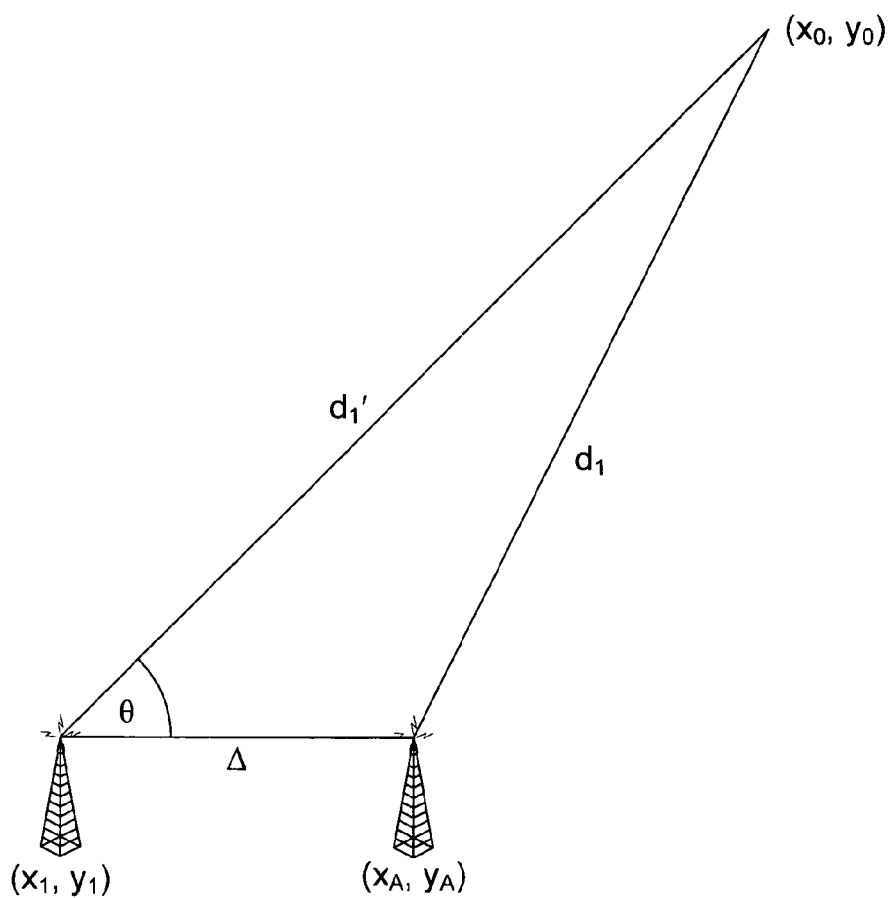
FIG. 3 is a diagram illustrating the directionally-dependent effects of a difference between an actual location of a base station and a listed location of a base station, in accordance with an exemplary embodiment of the present invention.

One problem with equations (2)-(5) is that the actual base station locations may differ from the base station locations that are listed in the BSA. For example, as shown in FIG. 3, the listed coordinates for a base station may be ($x_1$, $y_1$), but the actual location of the base station's antenna may be a distance, $\Delta$, away at coordinates ($x_A$, $y_A$). This means that $d_1$, the distance between a mobile station located at ($x_0$, $y_0$) and the actual base station antenna coordinates ($x_A$, $y_A$), may differ from $d_1'$, the distance between ($x_0$, $y_0$) and the listed coordinates ($x_1$, $y_1$).

The $d_1$ distance to the base station antenna is what is calculated from the phase measurement and time offset. In particular, $d_1 = c(\phi_1+b_1-b_0)$. On the other hand, the $d_1'$ value allows for calculations using the base station coordinates listed in the BSA. In particular, $d_1' = [(x_0-x_1)^2+(y_0-y_1)^2]^{1/2}$. It can be shown that the difference between $d_1$ and $d_1'$ can be represented by a correction value that is directional, i.e., that is dependent on the angle, θ, as shown in FIG. 3. If $d_1$ is much larger than Δ, then the correction value is approximately Δ cos θ. The directional correction value will be somewhere between ±Δ, depending on the direction of propagation of the pilot signal received by the mobile station.

In order to provide directional corrections within the framework of non-directional FLC values, $b_i$, that are conventionally used to correct for time offsets, directional FLC values, $b_i'$, may be defined according to the following expression:

$$b_i' = b_i + (d_i - d_i')/c \approx b_i + (\Delta \cos \theta)/c \qquad (6)$$

Each directional FLC value has a non-directional component, $b_i$, that corrects for a base station time offset and a directional component, $(d_i - d_i')/c$, that corrects for Δ, the base station's location offset. The directional FLC values may be stored in BSA database 34. Thus, a mobile station's location may be calculated using the following equations:

$$[(x_0-x_1)^2 + (y_0-y_1)^2]^{1/2} = c(\phi_1 + b_1' - b_0) \qquad (7)$$

$$[(x_0-x_2)^2 + (y_0-y_2)^2]^{1/2} = c(\phi_2 + b_2' - b_0) \qquad (8)$$

$$[(x_0-x_3)^2 + (y_0-y_3)^2]^{1/2} = c(\phi_3 + b_3' - b_0) \qquad (9)$$

$$[(x_0-x_4)^2 + (y_0-y_4)^2]^{1/2} = c(\phi_4 + b_4' - b_0) \qquad (10)$$

These calculations may be performed, e.g., by PDE 32, to determine the location of a mobile station in a receiving area. Thus, the PDE may obtain phase measurements of pilot signals from the mobile station and, retrieve from the BSA the directional FLC values appropriate for the pilot signals propagating into the mobile station's receiving area, and then calculate the mobile station's location using equations (7)-(10). This measurement and calculation process is summarized in FIG. 4.

Figure 4:
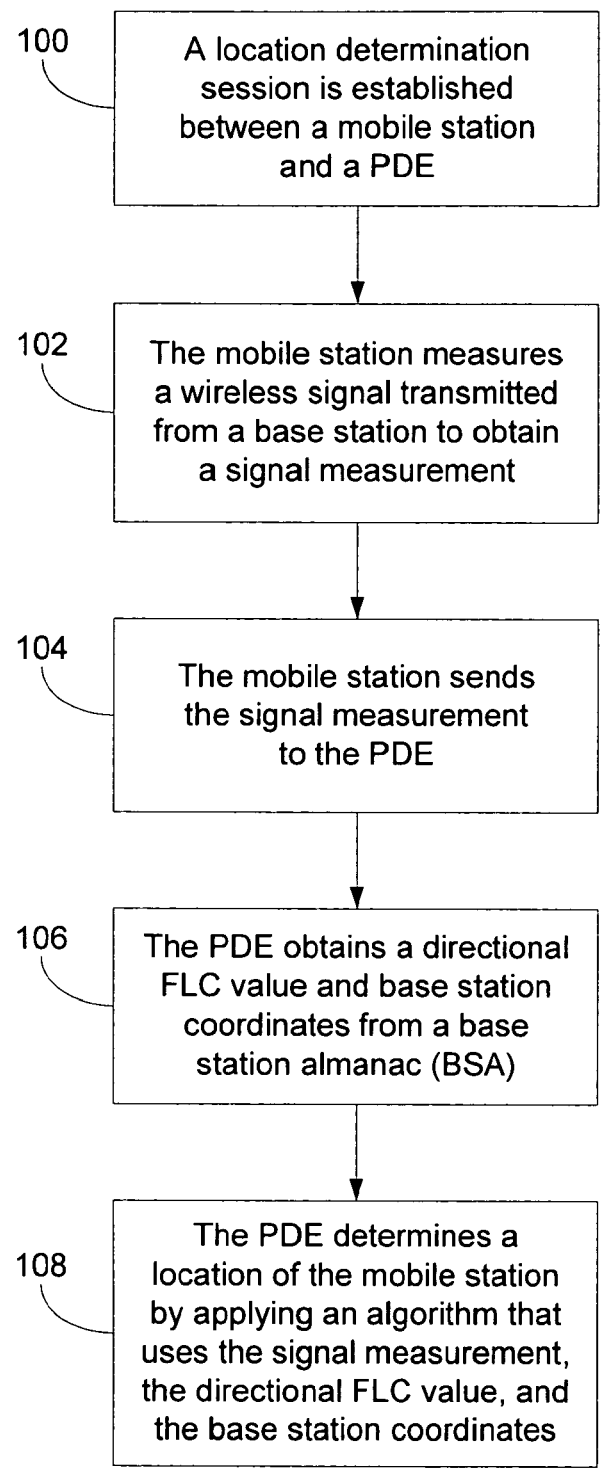
FIG. 4 is a flow chart illustrating a method for mobile station location determination, in accordance with an exemplary embodiment of the present invention.

As shown in FIG. 4, the process may begin when a location determination session is established between a mobile station and a PDE (e.g., between mobile station 10 and PDE 32), as indicated by block 100. The location determination session could be initiated by the mobile station, by the PDE, or in some other manner. During the location determination session, the mobile station and PDE may engage in communication that facilitates the determination of the mobile station's location. In the example of FIG. 4, the method uses at least one terrestrial signal to determine the mobile station's location. Thus, the location determination method could be, for example, an AFLT method that relies entirely on wireless signals transmitted by base stations or a hybrid method that relies on a combination of one or more wireless signals transmitted by base stations and one or more wireless signals transmitted by GPS satellites.

At some point during the location determination session, the mobile station measures a wireless signal transmitted from a base station to obtain a signal measurement, as indicated by block 102. For example, the mobile station might measure the phase of a pilot signal transmitted by a CDMA base station.

The wireless signal that is measured by the mobile station is propagating in a particular direction. For example, the mobile station may be operating in a given cell or sector (the mobile station's receiving area) and the base station's antenna may be located in a different cell or sector (the base station's transmitting area). The direction may then be defined by the position of the base station's transmitting area relative to the mobile station's receiving area.

In the example of FIG. 4, the PDE performs calculations based on the mobile station's signal measurements (though in other examples the mobile station may perform some or all of the calculations that would otherwise be performed by the PDE). Thus, in this example, the mobile station sends the signal measurement to the PDE, as indicated by block 104. Along with the signal measurement, the mobile station may also send an identification of the base station that transmitted the signal (i.e., an identification of the transmitting area) and an identification of the mobile station's receiving area.

The PDE receives the signal measurement and obtains other information used to calculate the mobile station's location. In particular, the PDE may obtain a directional FLC value and base station coordinates from a base station almanac (BSA), as indicated by block 106. For example, PDE 32 may look up these values in BSA database 34. The base station coordinates may include latitude and longitude coordinates for the base station that transmitted the signal measured by the mobile station. The directional FLC value may include a non-directional component, which corrects for the base station's time offset, and a directional component, which corrects for a difference between the actual location of the base station's antenna and the base station coordinates listed in the BSA. Thus, the directional FLC is specific for signals that are transmitted from the base station and propagate toward the mobile station's receiving area.

The PDE then determines a location of the mobile station by applying an algorithm that uses the signal measurement obtained by the mobile station, the directional FLC value, and the base station coordinates, as indicated by block 108. It is to be understood that the PDE may use other signal measurements as well, depending on the type of positioning algorithm that is applied. For example, for an AFLT positioning algorithm, the PDE may receive signal measurements from the mobile station for four base stations. The PDE may then obtain the four corresponding FLC values from the BSA and calculate the mobile station's location using equations (7)-(10), as set forth above. For a hybrid positioning algorithm, one or more of the base station signal measurements may be replaced by GPS pseudoranges.

4. Exemplary Method for Obtaining Directional FLC Values

Figure 5:
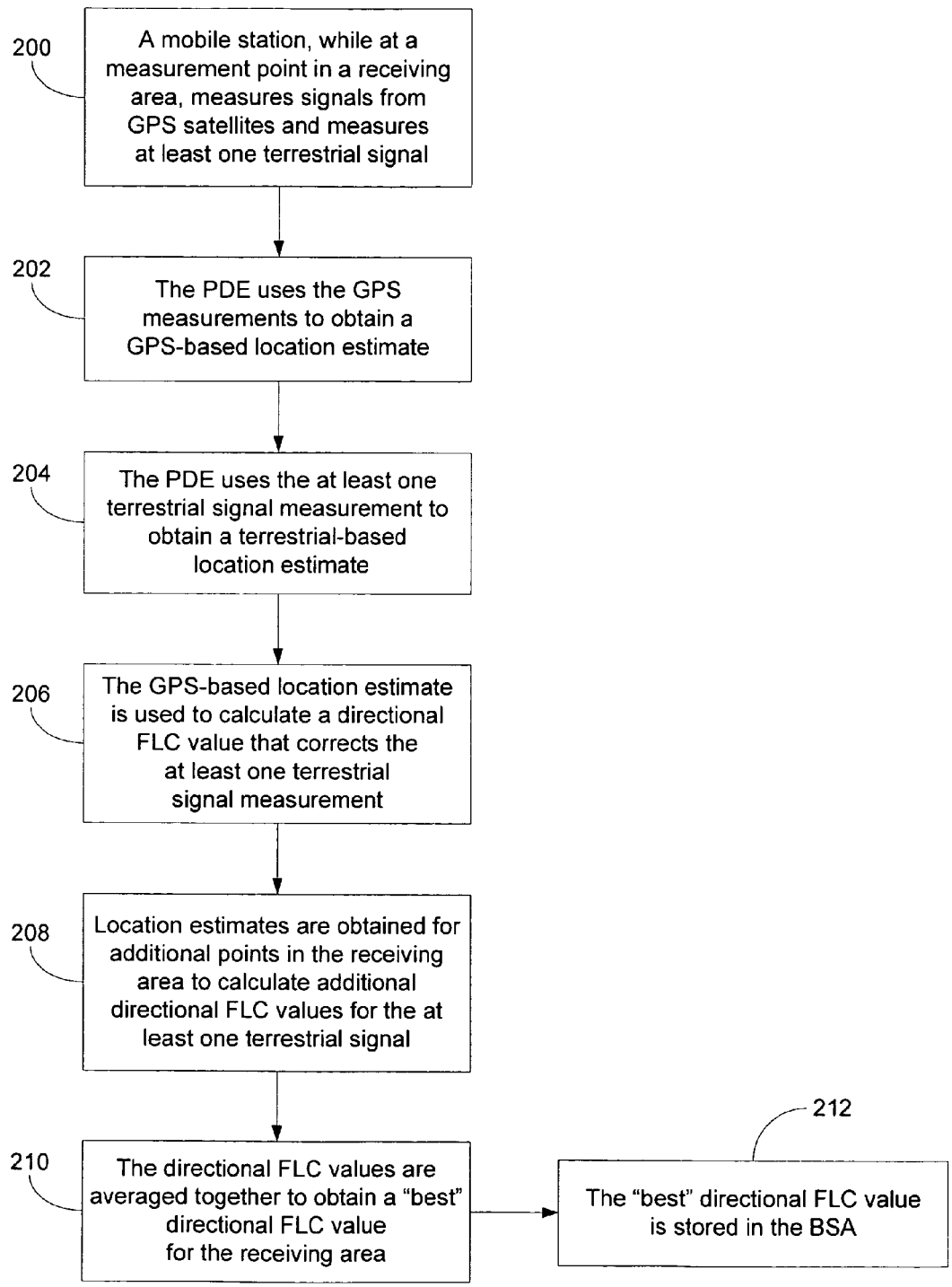
FIG. 5 is a flow chart illustrating a method for obtaining a directional forward link calibration (FLC) value, in accordance with an exemplary embodiment of the present invention.

FIG. 5 summarizes an exemplary method that may be used to calculate a directional FLC value that is specific to wireless signals from a particular base station antenna that propagate toward a receiving area. In the approach illustrated in FIG. 5, directional FLC values are calculated at various measurement points in the receiving area by comparing location estimates obtained by using one or more terrestrial signals (e.g., using AFLT or hybrid methods) with location estimates obtained by more accurate methods (e.g., using GPS).

The process may begin when a mobile station, while at a measurement point in a receiving area (e.g., in a particular cell or sector) measures signals from GPS satellites and also measures at least one terrestrial signal, as indicated by block 200. The measurement of at least one terrestrial signal could be, for example, a measurement of the phase of a pilot signal from a CDMA base station.

The mobile station sends the signal measurement to the PDE, and the PDE uses the signal measurements to estimate the mobile station's location at the measurement point in at least two different ways. For example, the PDE may use just the GPS measurements to obtain a GPS-based location estimate, as indicated by block 202. The PDE may also use the at least one terrestrial signal measurement to obtain a terrestrial-based location estimate, as indicated by block 204. In some cases, the PDE may obtain the terrestrial-based location estimate by using only terrestrial signal measurements (e.g., applying an AFLT positioning algorithm). Alternatively, the PDE may combine the at least terrestrial signal measurement with one or more of the GPS measurements to obtain the terrestrial-based location estimate (e.g., applying a hybrid positioning algorithm).

Because the GPS-based location estimate is obtained from GPS measurements alone, the GPS-based location estimate would typically be more accurate than the terrestrial-based location estimate. Thus, the GPS-based location estimate may be used to calculate a directional FLC value that corrects the at least one terrestrial signal measurement, as indicated by block 206. In particular, the directional FLC value may be calculated as a value that corrects the at least one terrestrial signal measurement so as to bring the location estimates calculated by the two different methods into agreement. The directional FLC value calculated in this way may correct for the transmitting base station's time offset and may also correct for a location difference between an actual location of the base station's antenna and the base station location listed in the BSA.

The process summarized in blocks 200-206 may be repeated for mobile stations located at other measurement points in the receiving area. In this way, location estimates may be obtained for additional points in the receiving area to calculate additional directional FLC values for the at least one terrestrial signal, as indicated by block 208.

The directional FLC values that are calculated for different points in the receiving area may differ because different points in the receiving area will receive the at least one terrestrial signal from somewhat different directions. However, for the purpose of simplicity, it may be desirable to have one directional FLC value for the entire receiving area. Thus, the directional FLC values calculated at different points in the receiving area may be averaged together to obtain a "best" directional FLC value for the receiving area, as indicated by block 210. The "best" directional FLC value may be stored in the BSA, as indicated by block 212. The directional FLC value stored in the BSA may be used to correct subsequent measurements of the at least one terrestrial signal, when measured at any point in the receiving area.

In this way, the method of FIG. 5 may be used to obtain directional FLC values for a BSA that previously contained only non-directional FLC values. The method of FIG. 5 may also be performed periodically in order to check or update existing directional FLC values. As a result, when the location of a base station antenna is changed, the corresponding directional FLC values stored in the BSA may be updated automatically to reflect the change.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method of correcting for a location difference between an actual location of a base station antenna and a listed location of said base station antenna, said method comprising:
   (a) measuring a wireless signal transmitted from a base station antenna and received at a measurement point in a receiving area to obtain a signal measurement;
   (b) obtaining a first location estimate of said measurement point by a first positioning method that uses said signal measurement and said listed location;
   (c) obtaining a second location estimation of said measurement point by a second positioning method, wherein said second location estimate is more accurate than said first location estimate;
   (d) calculating a correction value based, at least in part, on said first and second location estimates such that said correction value corrects for said location difference;
   performing steps (a) through (d) for a plurality of different measurement points in said receiving area to obtain a plurality of correction values; and
   averaging said plurality of correction values to obtain a directional forward link calibration (FLC) value that is specific for wireless signals that propagate from said base station antenna toward said receiving area.

2. The method of claim 1, wherein said signal measurement is a phase of a pilot signal transmitted from said base station antenna.

3. The method of claim 2, wherein said first positioning method is an advanced forward link trilateration (AFLT) positioning method or a hybrid positioning method.

4. The method of claim 3, wherein said second positioning method is a Global Positioning System (GPS)-based positioning method.

5. The method of claim 1, further comprising:
   storing said directional FLC value in a base station almanac (BSA).

6. The method of claim 5, further comprising:
   using said directional FLC value stored in said BSA to correct a subsequent measurement of a wireless signal transmitted from said base station antenna and received in said receiving area.

* * * * *